United States Patent

[11] 3,607,454

| [72] | Inventor | Hans Heiz |
| | | Dulliken, Bruggliacker, Switzerland |
| [21] | Appl. No. | 871,571 |
| [22] | Filed | Nov. 14, 1969 |
| [45] | Patented | Sept. 21, 1971 |
| [73] | Assignee | H. R. Schlatter |
| | | Kusnacht-ZH, Switzerland |
| | | Continuation of application Ser. No. |
| | | 591,991, Nov. 4, 1966, now abandoned. |

[54] PAINT COMPOSITION FOR RUSTY METALS AND METHOD THEREFOR
12 Claims, No Drawings

| [52] | U.S. Cl. | 148/6.15 R |
| [51] | Int. Cl. | C23f 7/10 |
| [50] | Field of Search | 148/6.15; 252/79.2 |

[56] References Cited
UNITED STATES PATENTS

| 2,030,601 | 2/1936 | McDonald | 148/6.15 X |
| 2,341,293 | 2/1944 | Rives | 308/241 |
| 2,725,310 | 11/1955 | McBride | 117/75 |
| 2,534,406 | 12/1950 | Bramberry | 308/4 |
| 2,813,813 | 11/1957 | Ley et al. | 148/6.15 |
| 2,835,618 | 5/1958 | Keller et al. | 148/6.15 |
| 3,123,582 | 3/1964 | Tryzna | 148/6.15 |
| 3,126,298 | 3/1964 | Patrick et al. | 117/161 |
| 3,133,838 | 5/1964 | Higgins | 148/6.15 |
| 3,198,673 | 8/1965 | Pooley et al. | 148/6.15 |

FOREIGN PATENTS

| 168,640 | 7/1951 | Austria |
| 761,293 | 11/1956 | Great Britain |

Primary Examiner—Ralph S. Kendall
Attorney—Nicholas M. Esser

ABSTRACT: An aqueous film-forming composition including at least 20 percent by weight phosphoric acid is applied to a rusted ferrous metal surface to chemically modify the rust and bind the modified rust to the metal.

PAINT COMPOSITION FOR RUSTY METALS AND METHOD THEREFOR

This application is a continuation of application Ser. No. 591,991 filed Nov. 4, 1966, now abandoned.

This invention relates to a composition and method for treating rusty metals. More particularly, this invention relates to a paint composition which can be applied as a primer directly to heavily rusted ferrous metals and subsequently coated with a paint, or alternatively, which can be incorporated directly into a paint and applied to the rusty metal.

The prior art teaches that if a rusty metal surface is to be painted care must be taken to remove the rust either by application of a rust remover composition or by wire brushing and the like. Care must be taken to remove all of the rust lest the later-applied paint will not adhere. Heavily rusted metals present an even greater problem. Paint or lacquer compositions containing phosphoric acid as a corrosion inhibitor wherein the composition is applied to clean metal and which contain about 3 percent phosphoric acid are described in the literature as, for example in U.S. Pat. No. 3,210,219. While effective rust removers and inhibitors have been devised, no product has been successfully produced which can be directly applied to heavily rusted metals without prior descaling to permanently bind the modified rust to the metal while simultaneously providing a protective film on the previously rusted metal surface.

It is therefore an object of this invention to provide a novel method for treating heavily rusted metal surfaces wherein the removal of such rust prior to painting is eliminated and a paintlike product for use therein. It is another object of this invention to provide a novel method for treating rusty metals wherein the greater amount of rust present on the metal is to the advantage of the material to be applied. It is another object of the present invention to provide a paint primer for rusty ferrous metals which can be applied directly to the rusty metal by itself or can be combined in a standard paint formulation and applied in a single operation. It is still another object of the present invention to provide a paint product for rusty metals which is economical to prepare as well as to apply. Other objects and advantages of this invention will be apparent to one skilled in the art from the following description and claims.

It has been found that if heavily rusted ferrous metals are coated with a composition containing an agent which will chemically modify the rust and also bind the modified rust with the metal and a vehicle for the agent, and the composition is allowed to dry on the metal, a primer coat is formed which can be subsequently coated with a conventional paint. Alternatively, the composition forming the primary coat can be preincorporated into a standard paint formulation and the mixture applied in a single finish coat. The preferred agent is phosphoric acid which is present in an amount of at least about 20 percent by weight. In the instance where the paint is of the epoxy resin type the phosphoric acid serves a threefold function in that in addition to reacting with the rust as well as the underlying metal it also serves as a curing agent for the epoxy resin.

The material forming the primer coat is preferably composed of about 85 percent phosphoric acid mixed into a combined vehicle and pigment composed of water, bentonite and finely powdered graphite to provide a film forming agent. The amount of phosphoric acid based on the total weight of the primer material is in the range of about 20 to 40 percent by weight. The same range of amounts of phosphoric acid is preferably employed when the basic primer material is incorporated as part of a paint product with film-forming agents of the epoxy resin or alkyd types, or combinations thereof. Especially good results were obtained when an epoxy resin, alkyd resin combination was employed.

The following specific examples are intended for the purpose of illustrating the present invention. They should not be construed as limiting the invention to the precise reactants, ingredients or conditions specified.

EXAMPLE I

| Material | Weight in grams |
| --- | --- |
| Phosphoric acid, 85% | 375 |
| Water | 275 |
| Bentonite | 175 |
| Graphite, fine powder | 175 |
| Total | 1,000 |

The phosphoric acid is poured into the water and the bentonite added while stirring. After the bentonite is completely dispersed the graphite is added while stirring for about 10 minutes. After the graphite is completely dispersed stirring is continued. Subsequently, the admixture is passed through a fine sieve and is stored for at least 72 hours prior to use. The primer may be applied by brushing, spraying or dipping. A top coat of a conventional paint may be applied after the primer has dried for at least 4 hours.

EXAMPLE II

| Material | Weight in grams |
| --- | --- |
| COMPONENT A | |
| Epon Resin 828 (Shell Chemical Co.) | 160 |
| Beckosol Solution, No. 1303-50 (Reichhold Chemicals Inc.) | 160 |
| Xylol | 160 |
| Nopcosulf CA-75 (Nopco Chemical Co.) | 20 |
| Total | 500 |
| COMPONENT B | |
| Phosphoric Acid, 85% | 220 |
| Water | 90 |
| Bentonite | 50 |
| Titanium dioxide | 30 |
| Graphite, fine powder | 110 |
| Total | 500 |

Component A is prepared by stirring in each compound in the order listed. Component B is prepared as described in example I.

Components A and B are mixed in equal proportions just prior to use. The product of components A and B of example II is applied as described in example I and has a pot life of about 8 hours.

EXAMPLE III

The products of examples I and II have been tested in accordance with the methods of ASTM D1014-51, "Results of Exterior Exposure Tests," ASTM B 117-62, "Salt Spray (Fog) Testing." Several commercially available products were used as controls. The results were interpreted according to ASTM D 610-43 "Standard Method of Evaluating Degree of Resistance to Rusting Obtained With Paint on Iron or Steel Surfaces."

TABLE I

RESULTS OF EXTERIOR EXPOSURE TESTS ASTM D1014-51

| Product | Rust | Blistering | Adhesion |
| --- | --- | --- | --- |
| Example I + Paint Coat | 9 | 9 | 9 |

TABLE I—Continued

RESULTS OF EXTERIOR EXPOSURE TESTS ASTM D1014–51

| Product | Rust | Blistering | Adhesion |
|---|---|---|---|
| Example II | 10 | 9 | 9 |
| Glidden Marine System | 4 | 4 | 7 |
| Rust–O–Leum | 4 | 2 | 2 |

TABLE II

RESULTS OF WATER IMMERSION TEST ASTM D870–54

| Product | Adhesion | Blistering | Rust |
|---|---|---|---|
| Example II Only | 10 | 10 | 10 |
| Example I + Paint Coat | 10 | 10 | 9 |
| Corroless Only | 6 | 8 | 8 |
| Corroless + Paint Coat | 7 | 8 | 9 |
| Rust–O–Leum | 0 | 2 | 3 |
| Glidden Marine System | 7 | 10 | 9 |

Interpretation for Tables I and II:

Numerical rating 0–10 (10 = best)

TABLE III.—RESULTS OF SALT SPRAY TEST ASTM B117–62

| Product | Blistering | Wrinkling | Roughening | Disintegration | Loss of adhesion | Rust spots |
|---|---|---|---|---|---|---|
| Example II | None | None | None | None | None | None. |
| Example I plus paint coat | None | None | None | None | None | Do. |
| Corroless only | None | None | None | Some | Severe | Many. |
| Corroless plus paint coat | None | None | None | Some | Slight | Do. |
| Clean metal | | | | | | Very heavy rust. |

In the examples, bentonite and graphite are employed as vehicles for the phosphoric acid. Other compatible paintlike vehicles could also be employed. In example II, Epon Resin 828 is utilized and is a low molecular weight epoxy resin of the epichlorohydrin/bisphenol A-type; Beckosol solution No. 1303–50 is a rosin-modified alkyd resin and the Nopcosulf is a mixture of sulfated vegetable, animal or fish oils employed as a plasticizer. It will be readily understood that any epoxy resin, alkyd resin and plasticizer can be employed in various percentage compositions, the only requirement being that the materials are compatibile and that the phosphoric acid is present in an amount to fulfil the dual function of modifying the rust as well as causing a reaction between the modified rust and the metal. If desired, epoxy resins or alkyd resin paints can be employed alone with the phosphoric acid and the addition of a plasticizer to either composition is optional.

It will thus be seen that a novel method for protecting rusty metals is now provided which obviates rust removal. No concern need be given any longer to assure complete rust removal to guarantee adherence nor is the degree of rust any problem. The unique paintlike product of the present invention is easily formulated. An undercoat composition is provided which can be covered subsequently with a standard paint or the undercoat can be combined with the paint to form a durable protective film in a single application.

The invention may be practiced in any of numerous ways which will be suggested by this disclosure to one skilled in the art by employing one or more of the novel features disclosed or equivalents thereof. All such practice coming within the spirit of the invention is considered to be within its scope as defined in the appended claims, wherein there is claimed:

I claim:

1. A method of treating rusty metals comprising coating a substantially rusted ferrous metal surface with a mixture consisting essentially of phosphoric acid present in amounts adapted to chemically modify the rust and to also bind the modified rust with the metal, and a film-forming vehicle, and maintaining said mixture in contact with said rusty surface for a sufficient period of time to allow said mixture to become substantially dry.

2. The method as defined in claim 1, including the step of applying an additional film-forming material to said modified and bound rust.

3. The method as defined in claim 1 wherein said vehicle includes bentonite.

4. The method as defined in claim 1 wherein said phosphoric acid is present in an amount at least about 20 percent by weight of the total phosphoric acid and vehicle.

5. The method as defined in claim 1 wherein said phosphoric acid is present in an amount in the range of about 20 percent to 40 percent by weight of the total phosphoric acid and vehicle.

6. The method as defined in claim 2 wherein said mixture of said phosphoric acid and said vehicle is applied prior to application of said film-forming material.

7. The method as defined in claim 2 wherein said mixture of said phosphoric acid and said vehicle is applied with said film-forming material in a single composition.

8. The method as defined in claim 6 wherein said film-forming material comprises alkyd or epoxy resins and in the instance of said epoxy resins the said phosphoric acid acts as a curing agent therefor.

9. A composition for forming a protective coating on heavily rust-covered ferrous metal surfaces consisting essentially of phosphoric acid present in an amount of at least about 20 percent by weight and an aqueous film-forming vehicle to effect prolonged contact of the phosphoric acid with the rust and the underlying metal at the interface therewith.

10. The composition as defined in claim 9 wherein said phosphoric acid is present in an amount up to about 40 percent by weight of the total phosphoric acid and vehicle.

11. The composition as defined in claim 9 wherein said vehicle comprises graphite as a film-forming agent.

12. The composition as defined in claim 9 further including an additional film-forming material for incorporation therewith, said material comprising a member selected from the group consisting of epoxy resins and alkyd resins.